Figure 7:
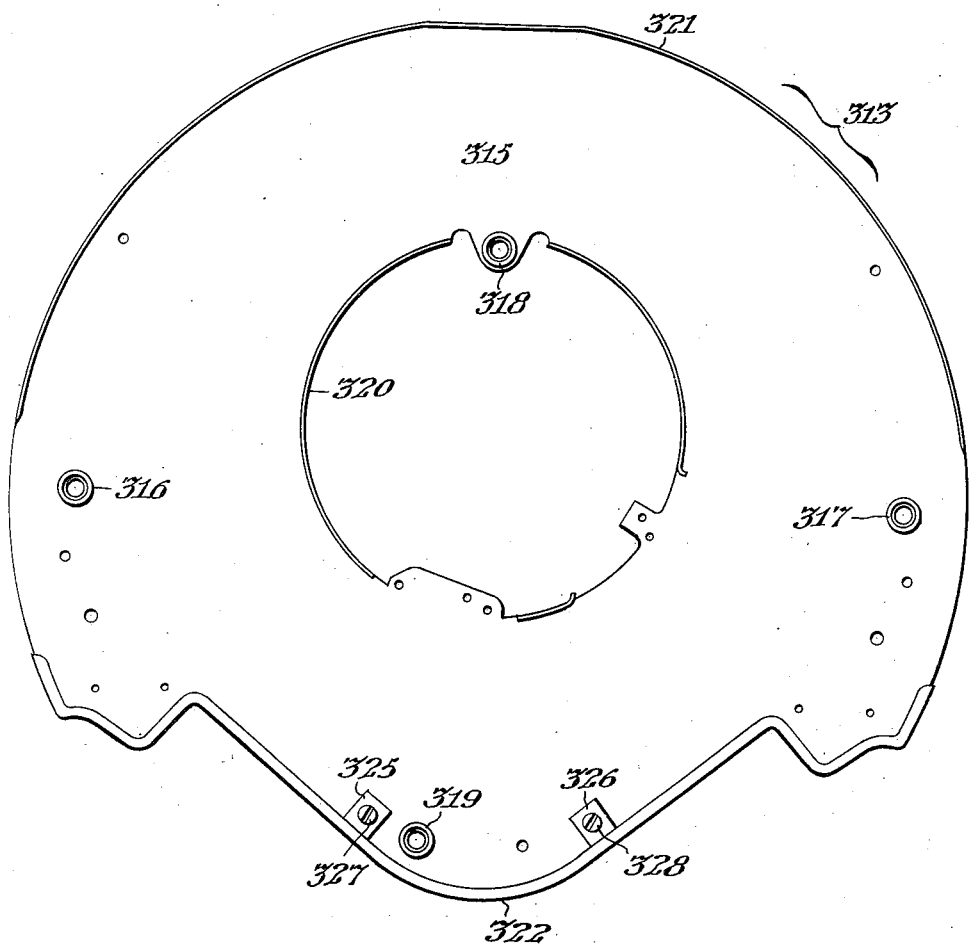

Nov. 4, 1941.　　R. C. ANGELL　　2,261,325
ACCESSORY TABLE
Filed March 16, 1940　　6 Sheets-Sheet 1
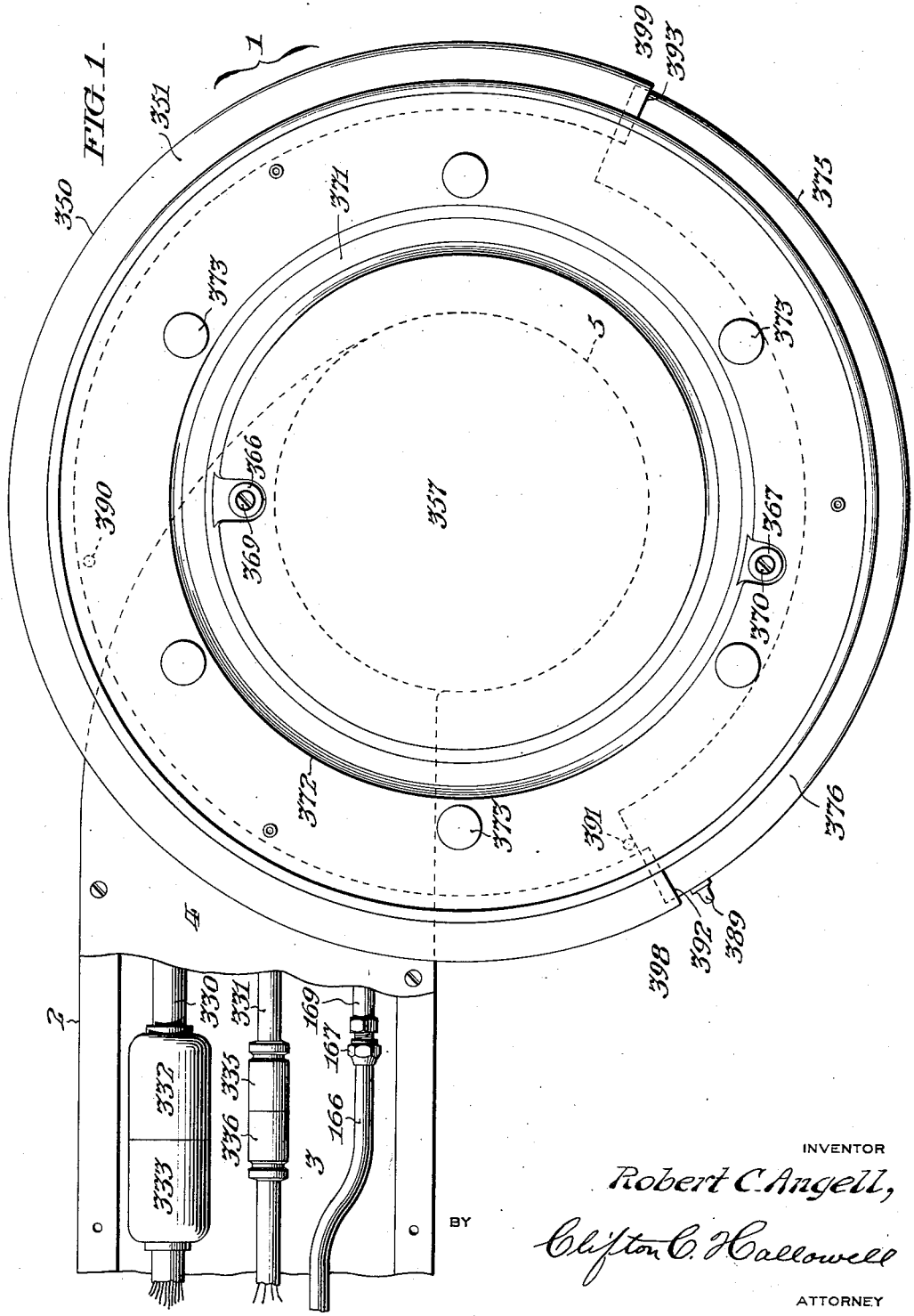
INVENTOR
Robert C. Angell,
Clifton C. Hallowell
ATTORNEY Nov. 4, 1941.  R. C. ANGELL  2,261,325
ACCESSORY TABLE
Filed March 16, 1940  6 Sheets-Sheet 2
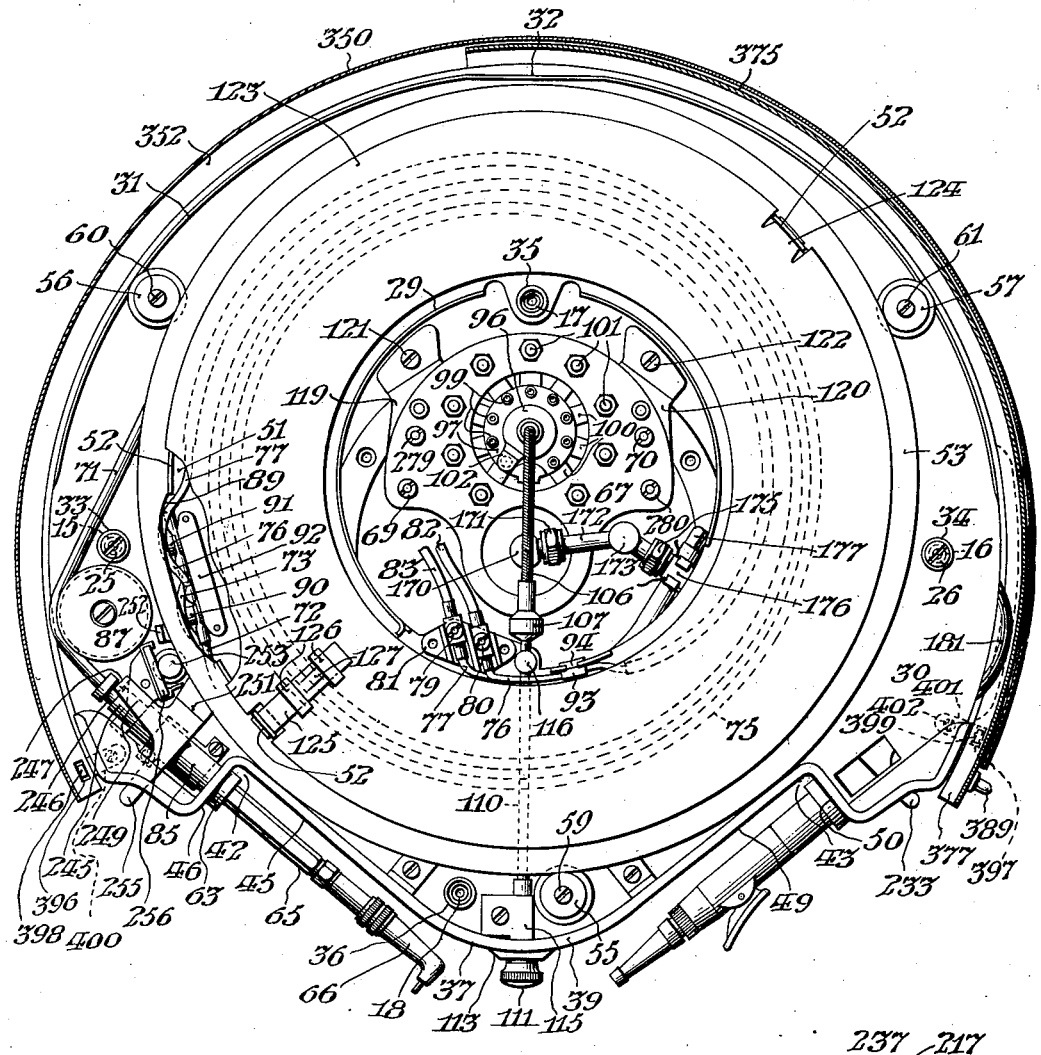
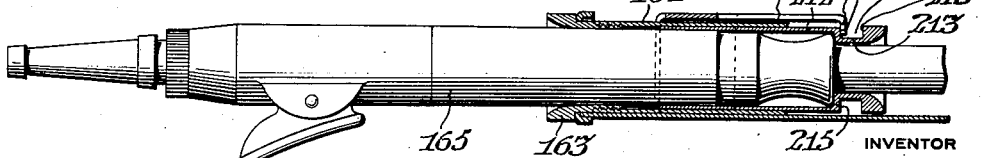

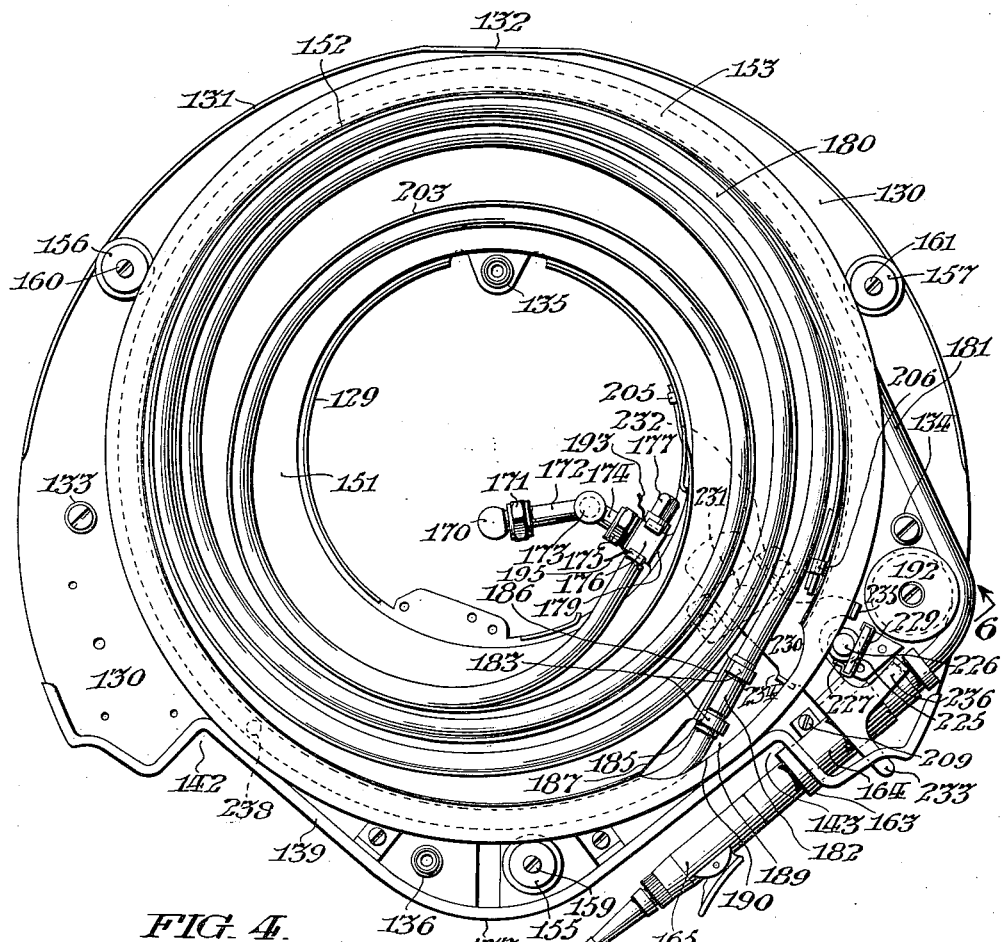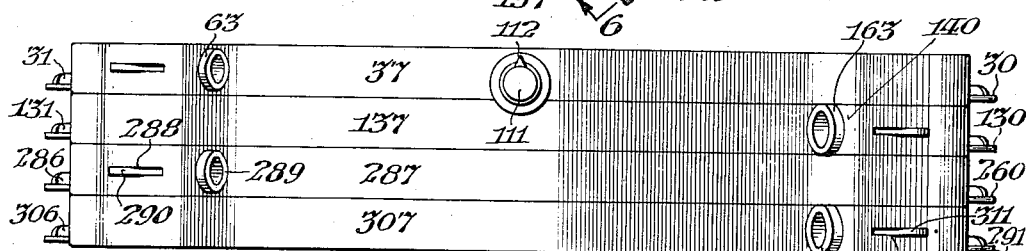

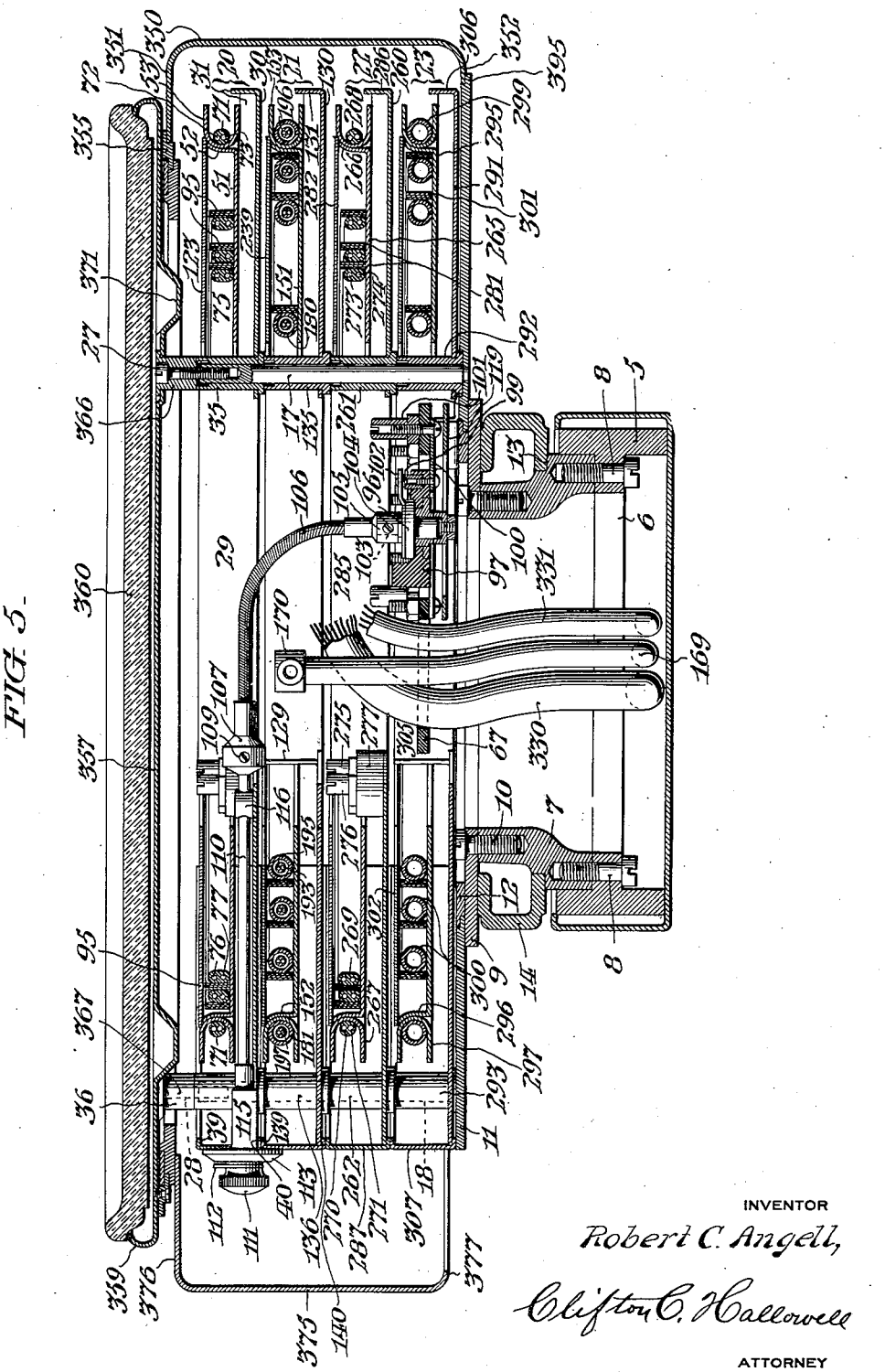

Nov. 4, 1941.   R. C. ANGELL   2,261,325
ACCESSORY TABLE
Filed March 16, 1940   6 Sheets-Sheet 5

INVENTOR
Robert C. Angell,
BY
Clifton C. Hallowell
ATTORNEY

Nov. 4, 1941.  R. C. ANGELL  2,261,325
ACCESSORY TABLE
Filed March 16, 1940  6 Sheets-Sheet 6

INVENTOR
Robert C. Angell,
BY
Clifton C. Callwell
ATTORNEY

Patented Nov. 4, 1941

2,261,325

UNITED STATES PATENT OFFICE 2,261,325

ACCESSORY TABLE

Robert C. Angell, Prince Bay, N. Y., assignor to The S. S. White Dental Manufacturing Company, a corporation of Pennsylvania Application March 16, 1940, Serial No. 324,319

13 Claims. (Cl. 32—22)

My invention relates particularly to that class of equipment supporting devices on which a plurality of conductor attached operative implements are assembled in relatively close approximation, readily available to the operator and including means arranged to retract said implements into inoperative position but permitting their convenient withdrawal, and is especially directed to the mode of assemblage of the supporting structure.

The principal objects of my invention are to provide an implement supporting structure comprising a plurality of readily removable and replaceable units embraced by a readily detachable and replaceable housing having an opening or port through which the supported implements may be withdrawn, and which may be covered by a movable closure complementary to the housing structure to encircle the several stacked units within said housing.

Other objects of my invention are to provide an instrument supporting structure having a plurality of trays arranged to carry the instrument connecting conductors spirally coiled thereon and to facilitate the convenient withdrawal and retractive movement of said instruments.

Further objects of my invention are to provide an instrument supporting structure, pivotally mounted, and comprising a plurality of unit structures superposed one upon another and provided with carriers rotatably mounted to revolve about a common axis and carrying operative implements with their flexible conductors spirally coiled thereon and so arranged that when said implements are withdrawn the alternate carriers rotate in opposite directions, whereby all of said implements may be withdrawn toward the region of use without rotatively adjusting said supporting structure on its pivotal mounting.

My invention includes an instrument supporting structure comprising a plurality of readily assembled and removable units each comprising a base plate which may or may not include a rotatable instrument tray or carrier, and be assembled one upon another, and enclosed in a readily removable and replaceable cover suspended from the top thereof and having a slidable closure slidably suspended from the top of said cover and arranged to rotate into and out of said cover.

My invention further comprehends a novel form of instrument holder and cooperative flexible conductor releasing lock whereby the retracting pull on the flexible conductor and its instrument is automatically arrested in any desired drawnout position of said instrument, but being readily released manually to effect retraction of said conductor and its connected instrument.

Specifically stated, the form of my invention as hereinafter described comprises an accessory equipment supporting device serving as a bracket table and comprising a base plate rotatably mounted on a pivoted supporting arm and provided with upwardly extending guides on which a plurality of instrument carrying units having spacing means forming columns rising from said supporting plate are mounted, said units each being complete in itself and capable of being readily removed, replaced or substituted as a whole, the columns serving as a support from which a housing and its closure may be suspended from its upper portion, and which is free to be lifted from said columns without disturbing the several assembled units. Any one of said units is capable of being replaced by a dummy spacing unit without having an instrument at its connecting conductor supported thereby. An important feature of my invention resides in each unit having a forward plate forming a shield and complementary with the plates of the several units, to provide an instrument panel wherein the instruments of the plates of the adjacent units are held in oppositely disposed pockets and directed in relatively intersecting planes.

My invention also includes all of the various novel features of construction and arrangement as hereinafter more definitely specified.

Figure 8:
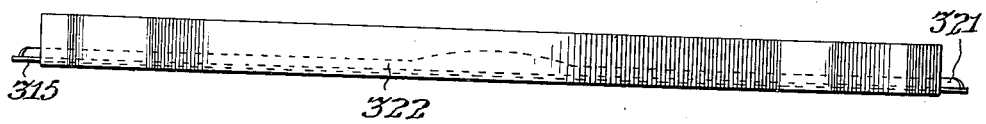
Figure 9:
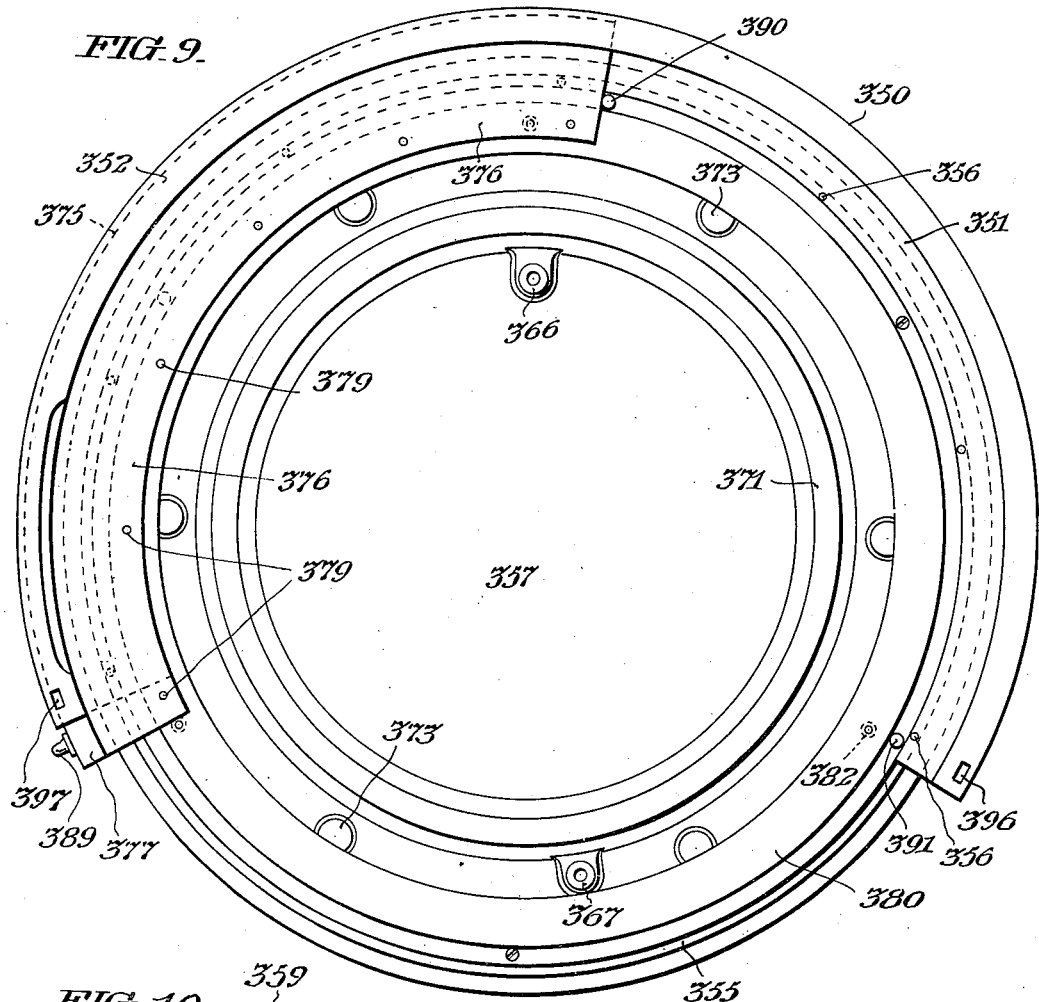
Figure 10:
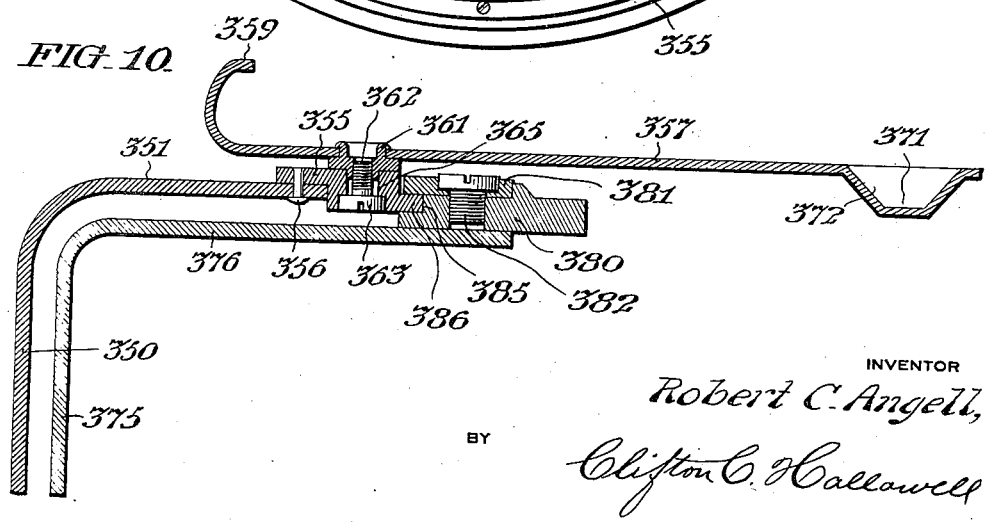

In the accompanying drawings, Figure 1 is a plan view of the bracket table, together with a fragment of the table supporting bracket arm upon which it is rotatably mounted, the table closure being shown in closed position, and the cover of said bracket arm being broken away to disclose the power conductor and conveyor connections leading into said table; Fig. 2 is a plan sectional view of the assembled table structure, the housing and its associated closure, depicted in open position, being shown in horizontal section for convenience of illustration; Fig. 3 is a plan view of one of the several units which are each complete in themselves and which when assembled in stacked relation, one upon the other, serve to make up the inner table structure about which the readily removable and replaceable table housing and its movable closure may be conveniently adjusted and secured to embrace said table structure; Fig. 4 is a front elevational view of the instrument panel formed by the complementary forwardly disposed vertical plates in the form of flanges extending upwardly from the bottom plates of the several units; Fig. 5 is a central vertical longitudinal sectional view of the table structure and the supporting bracket arm upon which it is mounted for limited rotative movement; Fig. 6 is a central vertical longitudinal sectional view of one of the instrument holders, taken on the line 6—6 in Fig. 3, and showing the instrument and its flexible connector in elevation for convenience of illustration; Fig. 7 is a plan view of a dummy tray or filling spacer arranged to be substituted for any one or more of the several individual units in event that it be found that one or more of the several complete units including the instrument and its connections may not be immediately required by the operator when acquiring the assembled table structure; Fig. 8 is a front elevational view of the dummy tray or spacer illustrated in Fig. 7, as viewed from the front thereof; Fig. 9 is an inverted plan view of the housing and its closure per se, and showing said closure retracted into said housing and in position to maintain the port of the housing open; and Fig. 10 is a fragmentary vertical sectional view illustrating the cooperative assembly of the housing and its closure whereby they may be operatively supported wholly from the upper wall of said housing and free to be lifted from the table assemblage to afford free access thereto for repair, replacement, adjustment or substitution of said units, and as readily replaced thereover, as best illustrated in Fig. 5.

In said figures, the bracket table 1 is conveniently supported for rotary adjustment upon the bracket arm 2 which, as shown in Fig. 1, is provided with the passageway 3 enclosed by the cover plate 4 and terminating in the annular support 5 which is provided with the inwardly projecting flange 6 preferably disposed intermediate of its upper and lower faces.

As shown in Fig. 5, the flange 6 affords a convenient rest for the upwardly extending annular spacer ring 7 which is secured to said flange 6 by the screws 8, and said spacer ring 7 carries on its upper surface the annular bearing plate 9 which is secured thereto by the screws 10.

With further reference to Fig. 5, the annular bearing plate 9 provides a slide bearing for the bracket table structure, the annular base plate 11 of which has its inner rabbeted margin slidably resting upon the outer peripheral margin of the bearing plate 9, and is retained in relatively rotatable relation therewith by the retaining ring 12 having its outer rabbeted margin cooperatively engaged with the inner rabbeted margin of the table base plate 11.

Said spacer ring 7 is provided with the bearing ledge 13 upon which an auxiliary accessory supporting bracket arm such as shown in my copending application Serial No. 266,174 may be swingably supported, or said ledge 13 may support the collar 14 as shown in Fig. 5, which may be substituted for such bracket arm, and serve as a space filling medium, and incidentally for ornamentation.

The base plate 11 of the table structure is provided with the standards 15, 16, 17 and 18 which serve as guides for the several accessory supporting units 20, 21, 22 and 23; that may be guided thereby into stacked relation one upon the other as shown in Fig. 5; and retained by the screws 25, 26, 27 and 28; see Figs. 2 and 5.

The accessory supporting unit 20, which is illustrated in plan view in Figs. 2 and 5, comprises the supporting frame plate 30 having the upturned inner well forming flange 29 and the upturned perimetral flange 31 extending along the rear half of said plate 30 and having a restricted region 32 centrally disposed, rising to a greater height above said plate and extending in a vertical plane transverse to a central vertical plane of the table structure and being normal thereto, and serving as a guard.

Said plate 30 is provided with the vertically disposed integral spacing sleeves 33, 34, 35 and 36 preferably extending above and below said plate and respectively registering with the standards 15, 16, 17 and 18 and cooperative therewith to guide said accessory supporting unit 20 into place in the stack with the subjacent units 21, 22 and 23 on the base plate 11 and cooperative with said units to maintain it in proper vertically spaced relation to said base plate 11.

The forward edge of the supporting frame plate 30 is of somewhat irregular formation providing indentations and said frame plate is provided with an upwardly projecting plate 37 providing a shield in the form of a flange and affording a forward wall conforming to the forward indentured edge of said frame plate 30 and having inturned lips 39 and 40 forming its upper and lower margins respectively. Said plate 37 is of such form as to provide instrument receiving recesses 42 and 43; said recess 42 being afforded by the substantially right-angular intersection of the plane walls 45 and 46, and the recess 43 being afforded by the substantially right-angular intersection of the plane walls 49 and 40.

The supporting frame plate 30 of the unit 20 conveniently supports, for relative rotation, the annular tray 51 having its peripheral margin upturned to provide the flange 52 to which the grooved rim affording the pulley 53 is secured. The tray 51 is rotatably supported by the rollers 55, 56 and 57 respectively mounted on the vertically disposed studs 59, 60 and 61 projecting upwardly from the frame plate 30, with which they may be threadedly engaged, the outwardly projecting edge margins of said pulley 53 engage the rabbeted edges of said rollers, as shown in Fig. 2, whereby the tray 51 is supported for free rotary movement.

The shield or plate 37 is provided in its plane wall 46 with an aperture for the bushing 63 which extends inwardly and provides a holder having a socket in which the handle 65 of a suitable electric instrument such as a pulp tester 66, or other desired substituted device, may be normally held when not in use, but which is capable of being readily withdrawn therefrom and directed to where it may be conveniently utilized to the advantage of the operator.

As shown in Fig. 2, the instrument handle 65 is operatively connected with the terminal binding posts 69 and 70 on the switch plate 67 through the flexible electric conductor comprising the conductor section 71 including the conductor wires 72 and 73, and the conductor section 75 including the conductor wires 76 and 77, which are connected through the binding posts 79 and 80 on the insulated connector block 81 with the terminal binding posts 69 and 70 on the switch plate 67 through the lead in wires 82 and 83. The conductor 75 is retained by the guard 32.

Referring again to Fig. 2, the flexible connector section 71 extends inwardly from the instrument handle 65 through the instrument holder 85, thence about the guiding sheave 87, by which it is guided into the groove of the pulley 53 and, normally extending therein almost completely throughout its circumference and terminating with its conductor wires 72 and 73 extending inwardly through the opening 89 in said pulley 53 and flange 52, and connected with the outer ends of the wires 76 and 77 of the conductor section 75 through the binding posts 90 and 91 on the block 92, of insulating material, which is secured to the floor of said tray 51 and carried thereby in its rotary movement.

As shown in dotted lines in Fig. 2, the flexible conductor section 75 is spirally coiled upon the floor of the tray 51 and the inner terminals of its wires 76 and 77 are engaged under the conductor retaining clip 93 before passing to the terminal binding posts 79 and 80. The retaining clip 93, as shown in Fig. 2, is engaged in the vertically extending slot 94 in the shorter of the three sections of the upturned well flange 29, and may be readily removed and replaced for convenience of adjustment.

As shown in Fig. 5, the coiled section 75 of the conductor illustrated in Fig. 2 has the strip leaf spring 95 coiled therewith and preferably laminar, being composed of a plurality of leaves and which as shown consists of three leaves connected at its opposite ends in a manner illustrated in the subjacent unit 21 depicted in Fig. 3.

As shown in Figs. 2 and 5, the switch comprising the plate 67 includes the rotary body member 96 which is mounted to rotate in the rheostat block 97 having the circularly arranged series of nine contact points 99, respectively connected by the contact strips 100 with the several corresponding terminals 101. Said rotary body member 96 carries the contact finger 102 arranged to selectively contact with any one of the several contact points 99.

With further reference to Figs. 2 and 5, the rotary body member is provided with the vertically extended stud 103, which may be removably engaged by the set-screw 104 with the socket fitting 105 on the inner end of a short length of flexible shafting 106. The outer end of said shafting 106, having the socket fitting 107 is removably engaged by the set-screw 109 with the stem 110 of the switch controlling knob 111, which is provided with the pointer 112 arranged to register with graduations indicated on the dial 113.

Said dial 113 may be conveniently attached to the bearing block 115 serving as the outer bearing for the switch actuating stem 110 which is rotatably supported at its inner region by the bearing block 116, both of said bearing blocks 115 and 116 being carried by the supporting frame plate 30, and remaining an integral part of the unit 20 which may be readily removed after backing out the set screw 109 and withdrawing the socket 107 of the flexible shaft connection from the free inner end of said switch actuating stem 110.

The switch structure is supported centrally with respect to the several units 20, 21, 22 and 23 and is disposed in the well or central chamber formed thereby, and is mounted upon the brackets 119 and 120, the feet of which are secured to the annular base plate 11 by the screws 121 and 122, as best illustrated in Fig. 2.

The spirally coiled conductor section 75 and its cooperative laminar spring 95 tending to maintain the coils of the conductor expanded and the consequent retraction of the instrument handle into its normally inoperative position, shown in Fig. 2, are maintained in operative relation on the floor of the tray 51 by the annular cover plate 123, which has one side of its peripheral margin cut to form the lug 124 arranged to engage a suitably provided slit in the flange 52 of the tray 51.

At the opposite edge margin, said cover plate 123 is provided with the radially adjustable bolt 125 formed of sheet material and engaged beneath the relatively spaced metal straps 126. The forward end of said bolt 125 is arranged to engage a suitably provided slit in the flange 52 of the tray 51, and said bolt is provided with the spring tongue 127 arranged to normally abut against the inner strap 126 when the bolt 125 is thus engaged in locked position; but being readily depressed to permit said bolt to be retracted to disengage the flange 52, and thereby permit the free removal of said cover plate 123.

Referring now more particularly to Fig. 3 wherein the unit 21, illustrated in section in Fig. 5, is shown in plan view, the supporting frame plate 130 having the upturned well forming flange 129 and the upturned perimetral flange 131 extending along the rear half of said plate 130 and having a restricted region 132 centrally disposed, rising to a greater height above said plate and extending in a vertical plane transverse to a central vertical plane of the table structure and being normal thereto, and serving as a guard.

Said plate 130 is provided with the vertically disposed integral spacing sleeves 133, 134, 135 and 136 preferably extending above and below said plate and respectively registering with the standards 15, 16, 17 and 18 and cooperative therewith to guide the accessory supporting unit into its place in the stack with the superjacent unit 20 and the subjacent units 22 and 23 on the base plate 11 and cooperative with said units to maintain it in proper vertically spaced relation to said base plate 11.

The forward edge of the supporting frame plate 130 is of indented formation and is provided with the upwardly extending shield or plate 137 in the form of a flange providing a forward wall conforming to the forward indentured edge of the frame plate 130 and having inturned lips 139 and 140 forming the upper and lower margins respectively. Said plate 137, like the plate 37, is of such form as to provide instrument receiving recesses 142 and 143.

The supporting plate 130 of the unit 21 conveniently supports, for relative rotation, the annular tray 151 having its peripheral margin upturned to provide the flange 152 to which the grooved rim affording the pulley 153 is secured. The tray 151 is rotatably supported by the rollers 155, 156 and 157 respectively mounted on the vertically disposed studs 159, 160 and 161 projecting upwardly from the frame plate 130 with which they may be threadedly engaged; the outwardly projecting edge margins of said pulley 153 engage the rabbeted edges of said rollers, as shown in Fig. 3, whereby the tray 151 is supported for free rotary movement.

The shield or plate 137 is provided in its recessed wall 141 with an aperture for the bushing 163 of the instrument holder comprising the sleeve 164 which provides a socket in which an implement, such as the warm air syringe 165, may be normally held when not in use, but which is capable of being conveniently withdrawn therefrom and directed to where it may be advantageously utilized by the operator.

The warm air syringe 165 is operatively connected with a source of air under pressure which is conveyed through the pipe 166 extending through the passageway 3 in the bracket arm 2 wherein it is connected, as shown in Fig. 1, by the readily separable coupling 167 with the flexible tubing conveyor 169 extending into the annular table support 5 and upwardly, as best shown in Fig. 5, into the central well of the bracket table 1, where it is connected with the fitting 170.

As shown in Figs. 2 and 3, the fitting 170 is connected by the coupling 171 with the nipple 172 of the air distributing body 173 whose nipple 174 is connected by the coupling 175 with the fitting 176 having the plug 177, said fitting 176 being supported on the shelf 179 projecting inwardly from the inner edge of the annular supporting frame plate 130.

Air from the fitting 176 is conveyed to the warm air syringe 165 through the connected sections of flexible tubing or hose 180 and 181, the flexible tubing 180 being loosely coiled spirally upon the floor of the tray 151 and having its outer end connected with the inner end of the flexible tubing or hose 181 by the tubular hose connection or splicer 182. This splicer is removably engaged with the clips 183 of the clip-bar 185 which is secured to the upturned lip 186 formed on the incut edge 187 in the outer peripheral edge margin of the floor of the tray 151, which is thus incut to provide an open recess 189 for said hose connection or splicer 182.

The splicer 182 is arranged to connect the flexible tubing 180 with the flexible tubing 181 which extends from said splicer 182 through the cutout 190 in the grooved pulley 153 and around its groove from which it extends tangentially outward around the sheave 192 on the annular supporting frame plate 130 and to the warm air syringe 165 in the holder comprising the bushing 163 and its extension 164.

As said warm air syringe embodies an electric heating element, the flexible tubing has the electrical conductors extending therethrough comprising the conducting wires 193 and 195, leading through the flexible tubing or hose 180 and the conducting wires 196 and 197 leading through the flexible tubing or hose 181, see Fig. 5, and being connected within the splicer 182 in a manner indicated in my prior United States Patent No. 1,972,027.

The conducting wires 193 and 195 are engaged by suitable clips on the fitting 176 from where they are arranged to extend to the suitably provided terminal on the controlling switch plate 67, and the conducting wires 196 and 197 extend into the warm air syringe 165 to be connected with an electric heating element therein contained.

The warm air syringe 165 may be extended by drawing it axially from its holder where it normally rests, as shown in Fig. 3, and directed to any desired position of use, and consequently the tray 151 will be rotated in a clockwise direction, thus causing the flexible tubing or hose 180 to so wind or tighten the coils thereon that they will assume a closely coiled relation toward the well center of the tray and closely embrace the well forming flange 129 of the supporting frame plate 130.

The reverse rotation of the tray 151 and consequent uncoiling of the flexible tubing 180 and retraction of the flexible tubing 181 with its warm air syringe 165, may be best effected by the spring 203, which may preferably be laminar, and which is extended spirally along with the flexible tubing or hose 180 so as to be disposed between the coils thereof, and act directly thereagainst in its effort tending to expand in exerting torque at the rim to effect reverse, or anti-clockwise rotation of the tray 151, and consequent retraction of the warm air syringe 165 into its holder.

In order that the spring 203 may be effective to perform its function, it is connected at its inner end to the flange 129 of the unit 21 by the clip 205 which is preferably unitary with said flange, and said spring 203 is connected at its outer end to said tray 151 by the clip 206 which is secured to the floor of the tray 151 adjacent to the outer peripheral flange 152 thereof and extends upwardly from said floor.

The instrument holder 164 for the warm air springe 165 is secured to the frame plate 130 by the screw 209, and, as illustrated in Fig. 6, said instrument holder includes the forwardly extending bushing 163 the bore of which broadens outwardly affording easy entrance of the warm air syringe 165 when retracted from its withdrawn position.

Said instrument holder 164 also includes the sleeve 212 slidably telescoped therein and embracing the inner end of the warm air syringe 165 and having a relatively reduced bore 213 providing a shoulder 215 against which the inner end of the warm air syringe abuts when in its normally inoperative position in said holder. The sleeve 212 is provided with the circumferential groove 216 encircling the reduced bore 213 and affording relatively spaced shoulders 217 and 218.

The clockwise rotation of the tray 151 on its supporting rollers 155, 156 and 157, which is effected by drawing the warm air syringe 165 outwardly for operative purposes, is resisted by the tension of the spring 203 which tends at all times to effect its reverse rotation. Said reverse rotation, however, is restricted or arrested to hold said tray stationary in any desired position while the warm air syringe is being used by the operator.

This holding of the tray 151 stationary in opposition to the tension of the spring 203 is effected by the cooperation of the locking block 225, which is secured to the supporting frame plate 130, and the trip or brake roller 226 which is interposed between said locking block 225 and the peripheral edges of the pulley 153 of said tray 151, said locking block 225 being so inclined with respect to said peripheral edges that the roller 226 wedges or jams between said locking block and said peripheral edges when said tray 151 is reversely rotated in anti-clockwise direction by the spring 203, as illustrated in Fig. 3, the roller 226 is limited in its forward movement by the buffer lug 227 of the spring clip 229 which embraces the locking block 225.

When the tray 151 is thus locked by the jamming of the brake roller 226, the operator may freely use the warm air syringe 165 without being hampered by any retractive pulling on its connected flexible tubing 181. When desired, however, the brake roller 226 may be released to permit the retracting spring 203 to effect reverse or anti-clockwise rotation of the tray 151 and the consequent retraction of the tubing 181 and warm air syringe 165 into the instrument holder 164. This may be conveniently effected by the trip lever 230 which is pivoted to rock on the pintle 231 in lever fulcrum plate 232 secured to the supporting frame plate 130.

Said trip lever 230 is free to rock horizontally on its pintle 231, and comprises the upwardly offset and outwardly projecting handle 233, by which it may be manually shifted to operatively engage its upwardly extending lug 235 with said brake roller 226, whereby said roller may be drawn forwardly to release it from its wedged or joined relation between the peripheral edges of the pulley 153 and the cooperative locking block 225, and thereby permit the tray 151 to be freely rotated by the spring 203 to withdraw the warm air syringe back into its holder 164, or said lever may be shifted by the stud 238.

As best shown in Fig. 3, the upwardly offset portion of the trip lever 230 and including the handle 233, is provided with the rearwardly projecting sleeve engaging lug 236 having the depending finger 237 projecting into the circumferential groove 216 of the sleeve 212, see Figs. 3 and 6, and arranged to engage either of the shoulders 217 or 218, whereby movement of the sleeve 212 incident to its frictional engagement with the tubing 181 as it slips therethrough, tends to shift the lug 235 of the trip lever 230 into position to engage or disengage the brake roller 226 depending upon the direction of movement of said tubing.

Although the trip lever 230 is free to rock on its pintle 231, it is arranged to be shifted to its normally inoperative position, as shown in Fig. 3, and so maintained by engagement of the rear end of the warm air syringe 165 with the internal shoulder 215 of the sleeve 212, see Fig. 6, whereby the said trip lever 230 is rocked into inoperative position by the engagement of the depending finger 237 with the shoulder 215 formed by the groove 216 in said sleeve 212.

From the foregoing it will be obvious that when it is desired to use the warm air syringe 165, it may be grasped by the operator and drawn outwardly to the desired extent, when by release of the pull by the operator on the connecting tubing 181, the sleeve 212 tends to slide rearwardly with said tubing, thus rocking the trip lever 230 and its lug 235 into inoperative position, and permitting the brake roller 226 to be rolled by engagement of the tray pulley 153 into a locking position between said pulley and the locking block 225, as illustrated in Fig. 3.

Now, assuming the warm air syringe to have been withdrawn into a useful position away from its holder, it may be retracted from such position by manually shifting the handle 233 of the trip lever 230 forward so as to cause the lug 235 to engage the brake roller 226 and force it from its locking position, thereby effecting release of the tray 151 and permitting its free anti-clockwise rotation by means of the spring 203 and consequent winding up of the flexible tubing 180 and 181 and retraction of the warm air syringe into its holder 164, as illustrated in Fig. 3.

The tray 151 is provided with the annular cover plate 239 which is similar to the cover plate 123 on the tray 51 shown in Fig. 2, and may be provided with a lug, such as the lug 124 shown in Fig. 2, arranged to engage a suitably provided slot in its flange 152, and said cover plate 239 may also be provided with a bolt, such as the bolt 125, shown in Fig. 2, which may engage a suitably provided slot in the flange 152, whereby the flexible tubing 180 and its associated spring 203 may be retained in position to insure convenient handling of the unit as an independent entity.

Referring again to Fig. 2, the instrument holder 85, like the instrument holder 164, shown in Fig. 3, includes the sleeve 245 having the groove 246 into which depends the finger 247 of the lug 249 on the handle 255 of the trip lever 251, which is mounted in a manner similar to the trip lever 230 shown in Fig. 3, and which has the lug 252 arranged to engage the brake roller 253 when the handle 255 of said trip lever 230 is shifted forwardly to force said brake roller 253 out of locked or jammed relation between the outer peripheral edges of the pulley 53 and the locking block 256, so that when the instrument handle 65 is withdrawn in extended relation to the holder 85, it will be retracted in the manner described above with respect to the warm air syringe, as illustrated in Fig. 3.

The unit 22 shown in section in Fig. 5 is substantially counterpart to the unit 20 hereinbefore described in detail, but is preferably adapted to carry an implement handle for the cautery and antrum lamp, not shown. Said unit 22 comprises the supporting frame plate 260 and including spacing sleeves, similar to the spacing sleeves of the superjacent units 20 and 21, of which but two, the sleeves 261 and 262, are shown in Fig. 5.

Said unit 22 also comprises the annular tray 265 having its peripheral margin upturned to provide the flange 266 to which the grooved rim affording the pulley 267 is secured. Said tray 265, like the trays 51 and 151, is rotatably supported and carries the flexible conductor 268, wrapped about the pulley 267, and includes the electric wires 270 and 271 and is arranged to be connected with the flexible conductor 269, which is spirally coiled upon the floor of the tray 265, and comprising the wires 273 and 274 arranged to be connected through the binding posts 275 and 276, on the insulated connector block 277, with the terminals 279 and 280 on the switch plate 67.

The coils of the flexible conductor 269 are arranged to be separated by the interposed spiral laminar spring 281 which tends to maintain the spiral coils of said conductor 269 distended and to thereby rotate the tray 265 in an anti-clockwise direction.

Said tray 265, like the trays 51 and 151, is provided with the annular cover plate 282, which serves to retain the spirally coiled flexible conductor 269 and the interposed spring 281 in operative position upon the floor of said tray 265.

The supporting frame plate 260 is provided with the upturned inner well forming flange 285, and the upturned peripheral flange 286 extending along the rear half of said frame plate 260. The forward edge of the frame plate 260 is provided with the upwardly projecting plate 287 affording a shield and serving as its forward wall. As shown in Fig. 4, said plate 287 is provided with an instrument receiving holder bushing 289, and said plate 287 has the slot 288 through which the trip lever handle 290 projects.

The unit 23, shown in section in Fig. 5, is substantially counterpart to the unit 21 above described in detail, but is preferably adapted to carry an implement such as an air cutoff, not shown, but of a well known type. Said unit 23 comprises the supporting frame plate 291 and including spacing sleeves, similar to the spacing sleeves of the superjacent units 20, 21 and 22, of which but two, the sleeves 292 and 293, are shown in Fig. 5.

Said unit 23 also comprises the annular tray 295 having its peripheral margin upturned to provide the flange 296 to which the grooved rim affording the pulley 297 is secured. Said tray 295, like the trays 51, 151 and 265, is similarly rotatably supported and carries the flexible tubing 299 wrapped about the pulley 297, and is arranged to be connected with the flexible tubing 300 which is spirally coiled upon the floor of the tray 295.

The coils of the flexible air conveyor tubing 300 are arranged to be separated by the interposed spiral laminar spring 301 which tends to maintain the spiral coils of said conductor 300 distended and to thereby rotate the tray 295 in an anti-clockwise direction.

The tray 295, like the trays 51, 151 and 265, is provided with the annular cover plate 302 which serves to retain the spirally coiled flexible conductor 300 and the interposed spring 301 in operative position upon the floor of the tray 295.

The supporting frame plate 291 is provided with the upturned inner well forming flange 305, and the upturned peripheral flange 306 extending along the rear half of the frame plate 291. The forward edge of said frame plate 291 is provided with the upwardly projecting plate 307 affording a shield and serving as its forward wall. As shown in Fig. 4, said plate 307 is provided with an instrument receiving holder bushing 309 for reception of the air cutoff when not in use, and said plate 307 has the slot 310 through which the trip lever handle 311 projects.

Should a prospective purchaser of the bracket table thus described determine that he might dispense with one or more of the units 20, 21, 22 or 23, assembled in the bracket table shown in Fig. 5, such unit may be displaced by substitution of the skeletonized or dummy unit 313, illustrated in Figs. 7 and 8, which includes the frame plate 315 provided with the spacing sleeves 316, 317, 318 and 319, and having the upturned inner well flange 320, the upturned peripheral flange 321 and the upwardly projecting imperforate plate 322 conforming to the corresponding plates 37, 137, 287 and 307 of the units 20, 21, 22 and 23 thus assembled in the bracket table illustrated in Fig. 5. Said plate 322 may be secured to said frame plate 315 by the angle brackets 325 ad 326 respectively secured thereto by the screws 327 and 328.

As shown in Fig 5, electric current is introduced into the bracket table 1 by the cables 330 and 331 each having a plurality of wires arranged to be connected to selected or predetermined terminals on the switch plate 67 and said cables extend downwardly into the bracket arm 2 and horizontally through its channeled passageway 3, see Fig 1, to a convenient source of electric current supply, the cable 330 being provided with the connection plug 332 and its socket 333 whereby said cable 330 may be conveniently severed to permit removal of the bracket table 1 from its supporting arm 2, and the cable 331 being provided with the connection plug 335 and its socket 336 whereby said cable 331 may be severed for the same purpose.

Referring now more particularly to the means of encasing the assembled structure comprising the readily separable units 20, 21, 22 and 23, shown in Fig. 5, the cylindriform housing 350 embraces said assembled units and comprises the upper inturned horizontal flange 351 and the lower inturned flange 352 of relatively less extent, the inner edge of which being of a diameter less than the maximum diameter of the assembled units, so that said housing 350 may be readily removed and replaced without disturbing said units, it being obvious that the housing may be lifted axially in removal or lowered over the assemblage in the act of replacement.

The housing is provided with the forward opening of preferably one hundred and twenty-five degrees extent, arranged to register with the instrument panel formed by the several complementary shield plates 37, 137, 287 and 307, as illustrated in Figs. 4 and 5, whereby convenient access may be had to the several implements that may be normally disposed in the respective implement holders 85, 164, 289 and 309, and to the switch controlling knob 111.

As shown in Fig. 5, the inner margin of the upper inturned horizontal flange 351 is reinforced by the annular slide ring 355 which may best be riveted to said flange by suitably spaced rivets 356, as shown in Fig. 10, and be secured to the service tray supporting pan 357 which has its peripheral margin 359 turned inwardly to retain the service tray 360 therein.

As best shown in Fig. 10, the service tray supporting pan 357 is provided with suitably spaced bushings 361 which are threadedly engaged by screws 362 whose heads 363 are engaged in the countersunk bores 365 in the slide ring 355.

The housing 350 is suspended in position to embrace the assembled units by said service tray pan 357 which has the depending bushings 366 and 367, the bushing 366 resting upon the column formed by the sleeves on the standard 17, and the bushing 367 resting upon the column formed by the sleeves on the standard 18, and said bushings 366 and 367 are secured to said standards 17 and 18 by the screws 327 and 328, see Figs. 1 and 5.

The service tray pan 357 may preferably be provided with the stiffening rib 371 extending intermediate its center and its perimeter and forming the channel 372, and said pan may be provided with the resilient supports 373 suitably spaced around said chanel 372, as best shown in Fig. 1, upon which the service tray 360 may rest.

As shown in Figs. 1, 5, 9 and 10, the housing 350 is provided with the segmental closure 375 having the upper inturned flange 376 and the lower inturned flange 377, and being arranged to move in a circular path into and out of said housing to open or close the forward opening in said housing and to shield the instrument panel when not in use, and being complemental to enclose the structure comprising the several units 20, 21, 22 and 23.

As illustrated in Figs. 9 and 10, the closure 375 has the inner margin of its upper inturned flange 376 secured, preferably by rivets 379, to the annular slide ring 380 which cooperates with the annular plate 381, secured thereto by the screws 382 to provide the peripheral rabbet or groove 385 into which the inwardly projecting circular flange 386 of the slide ring 355 extends in slidable relation, and serves as a circular track for the movement of said closure 375 into and out of its complemental housing 350.

The closure 375 is provided with the radially projecting handle 389 by which it may be slidably moved to its closed position, as shown in Fig. 1, or to its open position, as shown in Fig. 9, and said closure 375 is limited in its movement by the depending stop stud 390 with which the flange 376 engages when in open position, and by the depending stop stud 391 with which said flange engages when in closed position.

Although the housing 350 is suspended from the supporting columns including the standards 17 and 18, the lower free edge of said housing rests against the rabbeted peripheral margin 395 of the base plate 11 by which it is steadied and maintained rigid.

The lower inturned flange 352 of the housing 350 is provided near its forward edges 392 and 393 of said housing, with the rectangular apertures 396 and 397, which, when the housing 350 is in operative position, are engaged by the lugs 398 and 399 projecting upwardly from the cleats 400 and 401 which are conveniently secured to the base plate 11 by screws 402, as shown in Fig. 2, to maintain accurate registry between said housing and the assembled structure which it is designed to house.

My invention is advantageous in that the instruments of the several units being disposed alternately in opposite sides of the instrument supporting panel afford freedom of grasp and facilitate their movement to the positions of use by the operator.

Furthermore, by the construction illustrated, access to the assembled structure is facilitated by the ease of removal of the housing and its closure as a unit by the simple removal of but the two retaining screws 327 and 328, which also permits removal of the several units which are complete in themselves and may be readily replaced or others substituted, including the substitution of the dummy unit in which there are no working parts.

I do not desire to limit my invention to the precise details of construction and arrangement as herein set forth, as it is obvious that various modifications may be made therein without departing from the essential features of my invention as defined in the appended claims.

Having thus described my invention, I claim:

1. An accessory supporting assemblage comprising a plurality of readily removable and replaceable units each including a forwardly disposed flange complementary to form the forward wall of said assemblage and providing oppositely directed instrument receiving pockets, and also including a rotatable carrier upon which a flexible conductor may be spirally coiled with a portion wrapped about the periphery thereof and terminating in an operative instrument normally disposed in one of said pockets but capable of movement to a convenient region of use, the coils on the several carriers being disposed in relatively different directions and the respective instruments connected therewith being disposed in said pockets with their axes directed in relatively angular planes.

2. An accessory supporting assemblage comprising a plurality of relatively removable and replaceable units each including a forwardly disposed flange complementary when assembled one above the other to provide the forward wall for said assemblage and providing oppositely disposed instrument receiving pockets, the flange of each of said units being provided with an instrument holder disposed to support an instrument in one or the other of said pockets.

3. An accessory supporting assemblage comprising a plurality of relatively removable and replaceable units each including a forwardly disposed flange complementary when assembled one above the other to provide the forward wall for said assemblage and providing oppositely disposed instrument receiving pockets, the flange of each of said units being provided with an instrument holder disposed to support an instrument in one or the other of said pockets, each of said units being provided with a rotatable carrier arranged to support a spirally coiled flexible conductor connecting one of said instruments with a source of energy, and permitting it to be withdrawn from said holder and directed to a region of use.

4. An accessory supporting assemblage comprising a plurality of readily removable and replaceable units each being independently complete in itself and including a forwardly disposed flange complementary when assembled in stacked relation to provide the forward wall of said assemblage and affording an instrument panel provided with suitably disposed instrument holding sockets in which operative instruments may be normally supported and connected by spirally coiled conductors with a source of energy so as to be capable of withdrawal from said sockets and directed to the region of use, and means tending to retract said instruments back into said sockets.

5. An accessory supporting assemblage comprising a plurality of readily removable and replaceable units each being independently complete in itself and including a forwardly disposed flange complementary when assembled in stacked relation to provide the forward wall of said assemblage and affording an instrument panel provided with suitably disposed instrument holding sockets in which operative instruments may be normally supported and connected by spirally coiled conductors with a source of energy so as to be capable of withdrawal from said sockets and directed to the region of use, and means tending to retract said instruments back into said sockets, the instrument supporting holders of the relatively adjacent units being disposed to normally direct the axes of said instruments in relatively angular intersecting planes.

6. An accessory supporting assemblage comprising a plurality of readily removable and replaceable units each being independently complete in itself and including a forwardly disposed flange complementary when assembled in stacked relation to provide an instrument panel having a plurality of instrument receiving sockets in which operative instruments may be normally supported and connected by spirally coiled conductors with a source of energy so as to be capable of withdrawal from said sockets and directed to the region of use, means tending to expand said coils and thereby retract said instruments back into said sockets, means arranged to control said source of energy, and manually actuated means connected by a flexible shaft with the controlling means.

7. An accessory supporting assemblage comprising a plurality of readily removable and replaceable units each being independently complete in itself and including a forwardly disposed flange complementary when assembled in stacked relation to provide an instrument panel having a plurality of instrument receiving sockets in which operative instruments may be normally supported and connected by spirally coiled conductors with a source of energy so as to be capable of withdrawal from said sockets and directed to the region of use, means tending to expand said coils and thereby retract said instruments back into said sockets, means actuated about a vertically disposed axis arranged to control said source of energy, and manually actuated means arranged to rotate about a horizontally disposed axis connected by a flexible shaft with the controlling means.

8. An accessory supporting assemblage comprising a base having guides, a plurality of readily assembled and removable units slidably mounted on said guides, each being complete in itself and including a forwardly disposed flange, having an instrument holding socket, and complementary when thus assembled in stacked relation to provide an instrument panel having oppositely directed pockets in which the instruments may be disposed when not in use, and connected by spirally coiled conductors with sources of energy whereby said instruments may be withdrawn from their respective sockets to a desired region of use, and means tending to retract said instruments into their respective pockets.

9. An accessory supporting assemblage comprising a base having guides, a plurality of readily assembled and removable units slidably mounted on said guides, each being complete in itself and including a forwardly disposed flange, having an instrument holding socket, and complementary when thus assembled in stacked relation to provide an instrument panel having oppositely directed pockets in which the instruments may be disposed when not in use, and connected by spirally coiled conductors with sources of energy whereby said instruments may be withdrawn from their respective sockets to a desired region of use, means tending to retract said instruments into their respective pockets, and a housing for said assembled units removable and replaceable independently thereof, and having a lateral opening registrable with said panel.

10. An accessory supporting assemblage comprising a base having guides, a plurality of readily assembled and removable units slidably mounted on said guides, each being complete in itself and including a forwardly disposed flange, having an instrument holding socket, and complementary when thus assembled in stacked relation to provide an instrument panel having oppositely directed pockets in which the instruments may be disposed when not in use, and connected by spirally coiled conductors with sources of energy whereby said instruments may be withdrawn from their respective sockets to a desired region of use, means tending to retract said instruments into their respective pockets, a housing for said assembled units removable and replaceable independently thereof, and having a lateral opening registrable with said panel, and a closure wholly supported by said housing, slidable to open or close said panel opening.

11. An accessory supporting assemblage comprising a base, a plurality of readily removable and replaceable units, each unit including a forwardly disposed flange portion to form a part of the forward wall of said assemblage and providing an instrument receiving pocket and also including a rotatable carrier upon which a flexible conductor may be spirally coiled with a portion wrapped about the pirephery thereof and terminating in an operative instrument normally disposed in the said pocket but capable of movement to a convenient region of use, the flange portion of each said unit being disposed at an angle to the periphery of the corresponding carrier and the flange portions of the several units being peripherally spaced on said base, some of said flange portions and their pockets being oppositely directed from other flange portions and their pockets, the coils on the several carriers being disposed in relatively different directions and the respective instruments connected therewith being disposed in said pockets with their end directed in relatively opposite directions, and means included in said assemblage for closing the spaces between said flange portions whereby to provide a recess for said instruments with some of the instruments extending into said space from the one direction and other instruments extending into said space from the opposite direction.

12. An accessory supporting assemblage comprising a base, a plurality of relatively removable and replaceable units mounted on the base and each including a forwardly disposed flange portion, said flange portions being effective when the units are assembled one above the other to provide parts of the forward wall for said assemblage and said flange portions each providing an oppositely disposed instrument receiving pocket, the pockets of some of said units being oppositely directed and peripherally spaced from the pockets of other units, the flange portion of each of said units being provided with an instrument holder disposed to support an instrument in said pocket, and means included in said assemblage for closing the spaces between said flange portions whereby to provide a recess for said instruments with some of the instruments extending into said space from one direction and other instruments extending into said space from the opposite direction.

13. An accessory supporting assemblage comprising a base having standards affording guides, a plurality of units slidably mounted in vertically stacked relation on said standards, each said unit including a flange portion and also a recessed portion cooperative with the recessed portions of other units to provide a recessed instrument receiving space, said units each including means for supporting and connecting an operative instrument and also a positioning structure on the flange portion thereof for defining the location of said instrument when retracted, the positioning structure of at least one said unit being directly opposite to that of another and separated therefrom by the horizontal distance of said instrument receiving space, a separable housing arranged to envelop said assembled units and having an opening opposite said recessed instrument receiving space, and a door for closing said opening and thereby covering said instruments when in retracted position and slidable into a space between the housing and units for revealing said instruments.

ROBERT C. ANGELL.